United States Patent
Aida et al.

(10) Patent No.: US 10,305,811 B2
(45) Date of Patent: May 28, 2019

(54) CONTROL APPARATUS, COMMUNICATION SYSTEM, COMMUNICATION NODE CONTROL METHOD, AND PROGRAM

(71) Applicant: NEC Corporation, Minato-ku, Tokyo (JP)

(72) Inventors: Takafumi Aida, Tokyo (JP); Hiroshi Ueno, Tokyo (JP)

(73) Assignee: NEC CORPORATION, Tokyo (JP)

( * ) Notice: Subject to any disclaimer, the term of this patent is extended or adjusted under 35 U.S.C. 154(b) by 109 days.

(21) Appl. No.: 14/652,880

(22) PCT Filed: Dec. 27, 2013

(86) PCT No.: PCT/JP2013/085050
§ 371 (c)(1),
(2) Date: Jun. 17, 2015

(87) PCT Pub. No.: WO2014/104277
PCT Pub. Date: Jul. 3, 2014

(65) Prior Publication Data
US 2015/0334032 A1    Nov. 19, 2015

(30) Foreign Application Priority Data
Dec. 28, 2012    (JP) ................................. 2012-288378

(51) Int. Cl.
*H04L 12/823* (2013.01)
*H04L 12/751* (2013.01)
*H04L 12/46* (2006.01)

(52) U.S. Cl.
CPC .......... *H04L 47/32* (2013.01); *H04L 12/4625* (2013.01); *H04L 12/4641* (2013.01); *H04L 45/02* (2013.01)

(58) Field of Classification Search
CPC ..... H04L 47/32; H04L 12/4625; H04L 45/02; H04L 12/4641; H04L 49/354; H04L 61/6022; H04L 45/48
See application file for complete search history.

(56) References Cited

U.S. PATENT DOCUMENTS 5,892,912 A * 4/1999 Suzuki ................ H04L 12/4608
370/395.53
6,873,602 B1 * 3/2005 Ambe ................. H04L 12/4641
370/254
(Continued)

FOREIGN PATENT DOCUMENTS

| JP | H09-130421 A | 5/1997 |
| JP | 2001-053776 A | 2/2001 |

(Continued)

OTHER PUBLICATIONS

Cisco, Cisco Application Control Engine: A Technical Overview of Virtual Partitioning, 2007, 24 pages.*

(Continued)

*Primary Examiner* — Mounir Moutaouakil

(57) ABSTRACT

The present invention reduces the labor required for setting VLAN information in the ports of the communication nodes in a centralized-control-type communication system. A control apparatus includes: a connection detection unit configured to detect connection of a terminal or a virtual machine to a control target communication node; a first VLAN information determination unit configured to determine VLAN information that is set in a port of the communication node, the port having been connected to the terminal or the virtual machine, on the basis of a virtual network to which the detected terminal or virtual machine belongs; and a VLAN information setting unit configured to set the determined VLAN information in the port.

17 Claims, 14 Drawing Sheets

(56) References Cited

U.S. PATENT DOCUMENTS

| | | | |
|---|---|---|---|
| 7,957,325 B2* | 6/2011 | Rose | H04L 12/4625 370/255 |
| 2005/0180391 A1* | 8/2005 | Shimada | H04L 12/4645 370/351 |
| 2006/0114915 A1 | 6/2006 | Kalkunte et al. | |
| 2006/0227777 A1* | 10/2006 | Shimizu | H04L 12/4641 370/389 |
| 2007/0211737 A1* | 9/2007 | Rose | H04L 12/4625 370/401 |
| 2008/0240100 A1* | 10/2008 | Smith | H04L 12/4641 370/392 |
| 2011/0149800 A1 | 6/2011 | Ryan et al. | |
| 2012/0020220 A1* | 1/2012 | Sugita | H04L 63/02 370/235 |
| 2012/0063363 A1 | 3/2012 | Li et al. | |
| 2012/0075991 A1* | 3/2012 | Sugita | G06F 9/505 370/235 |
| 2013/0148500 A1 | 6/2013 | Sonoda et al. | |
| 2017/0366471 A1* | 12/2017 | Baker | H04L 47/828 |

FOREIGN PATENT DOCUMENTS

| | | | |
|---|---|---|---|
| WO | WO2011081020 | * | 6/2011 |
| WO | WO2011074516 | * | 7/2011 |
| WO | 2012/144190 A1 | | 10/2012 |

OTHER PUBLICATIONS

International Search Report for PCT Application No. PCT/JP2013/085050, dated Mar. 18, 2014.

Nick McKeown, et. al., OpenFlow: Enabling Innovation in Campus Networks, Mar. 14, 2008.

"Open Flow Switch Specification" Version 1.3.1. Wire Protocol 0x04. Sep. 6, 2012.

Extended European Search Report for EP Application No. EP13867412.2 dated Jul. 26, 2016.

Chinese Office Action for CN Application No. 201380068811.9 dated on Jul. 3, 2017 with English Translation.

Maruyoshi et al., "Layer 2 Extranet Service on Global Area Virtual Ethernet Service", IEICE General Conference, Mar. 2004, p. 273, B-7-64 with English Translation, cited in JPOA.

Japanese Office Action for JP Application No. 2014-554582 dated May 8, 2018 with English Translation.

* cited by examiner

FIG. 6

| VIRTUAL NETWORK ID | GATE VLAN ID | Core VLAN ID | SERVER-SIDE GATE VLAN ID |
|---|---|---|---|
| VIRTUAL NETWORK A | 100 | 4094 | 200 |
| VIRTUAL NETWORK B | 300 | 4094 | 200 |
| .. | .. | .. | .. |

CONTROL APPARATUS, COMMUNICATION SYSTEM, COMMUNICATION NODE CONTROL METHOD, AND PROGRAM

REFERENCE TO RELATED APPLICATION

The present invention relates to a control apparatus, a communication system, a communication node control method, and a program. This application is a National Stage Entry of PCT/JP2013/085050 filed on Dec. 27, 2013, which claims priority from Japanese Patent Application 2012-288378 filed on Dec. 28, 2012, the contents of all of which are incorporated herein by reference, in their entirety. In particular, it relates to: a control apparatus that controls communication nodes in a centralized manner; a communication system; a communication node control method; and a program.

TECHNICAL FIELD

Background

In Non-patent Literatures 1 and 2, a technique referred to as OpenFlow has been proposed. OpenFlow recognizes communications as end-to-end flows and performs path control, failure recovery, load balancing, and optimization on a per-flow basis. Each OpenFlow switch according to Non-patent Literature 2 has a secure channel for communication with an OpenFlow controller and operates according to a flow table suitably added or rewritten by the OpenFlow controller. In the flow table, a set of the following three is defined for each flow: match conditions (Match Fields) against which a packet header is matched; flow statistical information (Counters); and instructions that define at least one processing content (see section "5.2 Flow Table" in Non-patent Literature 2).

For example, when an OpenFlow switch receives a packet, the OpenFlow switch searches the flow table for an entry having a match condition that matches header information of the received packet (see "5.3 "Matching" in Non-patent Literature 2). If, as a result of the search, the OpenFlow switch finds an entry that matches the received packet, the OpenFlow switch updates the flow statistical information (Counters) and processes the received packet on the basis of a processing content(s) (packet transmission from a specified port, flooding, dropping, etc.) written in the Instructions field of the entry. If, as a result of the search, the OpenFlow switch does not find an entry that matches the received packet, the OpenFlow switch transmits an entry setting request to the OpenFlow controller via the secure channel. Namely, the OpenFlow switch requests the OpenFlow controller to transmit control information for processing the received packet (Packet-In message). The OpenFlow switch receives a flow entry that defines a processing content(s) and updates the flow table. In this way, by using an entry stored in the flow table as control information, the OpenFlow switch performs packet forwarding.

In addition, Example 2 in Non-patent Literature 1 describes that a virtual network such as a VLAN (Virtual Local Area Network) can be established by combining OpenFlow switches and an OpenFlow controller that controls the OpenFlow switches in a centralized manner.

In addition, the specification in Non-patent Literature 2 describes that a control message for an additional function, which is referred to as an "Experimenter message," can be exchanged between the OpenFlow controller and an OpenFlow switch ("A.5.4 Experimenter" in Non-patent Literature 2).

Non-Patent Literature 1

Nick McKeown, and seven others, "OpenFlow: Enabling Innovation in Campus Networks," [online],appearing in Computer Communication Review, April 2008.

Non-Patent Literature 2

"OpenFlow Switch Specification" Version 1.3.1 (Wire Protocol 0x04).

SUMMARY

The following analysis has been given by the present inventors. The above Non-patent Literatures 1 and 2 disclose that a virtual network can be established by setting VLAN information as match conditions in entries stored in flow tables in OpenFlow switches (which will simply be referred to as a "switch," as needed), respectively.

However, among such switches that can configure a virtual network by using OpenFlow, there are some switches whose port needs to be associated with appropriate VLAN information. Thus, when an unknown terminal or virtual machine is connected to any of the switches or when change is made in the configuration of the network, appropriate VLAN information needs to be associated with the relevant switch port(s).

Some of the switches whose port needs to be associated with appropriate VLAN information include a function of dropping a packet including VLAN information inappropriate in relation to a corresponding egress port. In addition, some switches include a function of dropping, when receiving a packet in which specified VLAN information is not set, the packet. These functions can be used in place of flow entries for dropping packets having VLAN information inappropriate in relation to a port. Thus, these functions contribute to reducing the number of flow entries stored in each switch and improving the response of each switch.

An object of the present invention is to provide a control apparatus, a communication system, a communication node control method, and a program that contribute to reducing the labor required for setting VLAN information in the ports of the communication nodes in a centralized-control-type communication system as typified by a system using the above OpenFlow.

According to a first aspect, there is provided a control apparatus, including: a connection detection unit configured to detect connection of a terminal or a virtual machine to a control target communication node; a first VLAN information determination unit configured to determine VLAN (Virtual Local Area Network) information that is set in a port of the communication node, the port having been connected to the terminal or the virtual machine, on the basis of a virtual network to which the detected terminal or virtual machine belongs; and a VLAN information setting unit configured to set the determined VLAN information in the port.

According to a second aspect, there is provided a communication system, including: a communication node configured to include a function of dropping, when receiving an instruction for transmitting a packet in which specified VLAN (Virtual Local Area Network) information is not set via a certain port, the packet or a function of dropping, when receiving a packet in which specified VLAN information is not set via a certain port, the packet; and a control apparatus, including: a connection detection unit configured to detect connection of a terminal or a virtual machine to the specified port of the communication node; a first VLAN information determination unit configured to determine VLAN information that is set in a port of the communication node, the port having been connected to the terminal or the virtual machine, on the basis of a virtual network to which the detected terminal or virtual machine belongs; and a VLAN information setting unit configured to set the determined VLAN information in the port.

According to a third aspect, there is provided a communication node control method, including: detecting connection of a terminal or a virtual machine to a control target communication node; determining VLAN (Virtual Local Area Network) information that is set in a port of the communication node, the port having been connected to the terminal or the virtual machine, on the basis of a virtual network to which the detected terminal or virtual machine belongs; and setting the determined VLAN information in the port. This method is associated with a certain machine, namely, with a control apparatus that sets VLAN information in ports of communication nodes.

According to a fourth aspect, there is provided a program, causing a computer that controls communication nodes to execute processing for: detecting connection of a terminal or a virtual machine to a control target communication node; determining VLAN (Virtual Local Area Network) information that is set in a port of the communication node, the port having been connected to the terminal or the virtual machine, on the basis of a virtual network to which the detected terminal or virtual machine belongs; and setting the determined VLAN information in the port. This program can be recorded in a computer-readable (non-transient) storage medium. Namely, the present invention can be embodied as a computer program product.

The present invention contributes to reducing the labor required for setting VLAN information in the ports of the communication nodes in a centralized-control-type communication system.

BRIEF DESCRIPTION OF THE DRAWINGS

FIG. 6 illustrates exemplary VLAN gate control information stored in a virtual network DB according to the first exemplary embodiment of the present invention.

Figure 1:
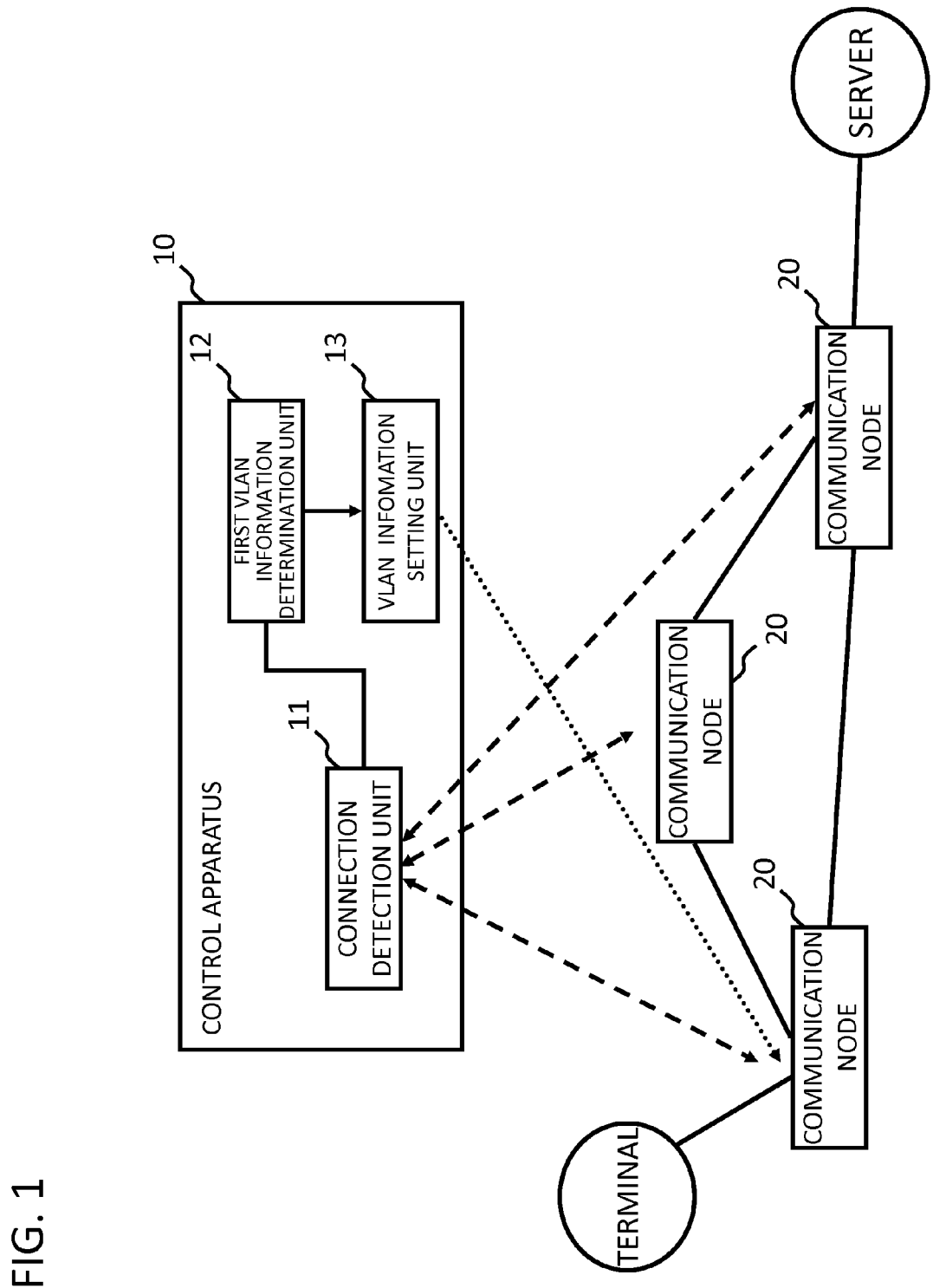
FIG. 1 illustrates a configuration of an exemplary embodiment according to the present invention.

First, an outline of an exemplary embodiment of the present invention will be described with reference to a drawing. In the following outline, various components are denoted by reference characters for the sake of convenience. Namely, the following reference characters are merely used as examples to facilitate understanding of the present invention, not to limit the present invention to the illustrated modes.

As illustrated in FIG. 1, an exemplary embodiment of the present invention can be realized by a configuration including: a plurality of communication nodes 20; and a control apparatus 10 that controls these communication nodes 20. More specifically, the control apparatus 10 includes: a connection detection unit 11 configured to detect connection of a terminal or a virtual machine to a control target communication node 20; a first VLAN information determination unit 12 configured to determine VLAN (Virtual Local Area Network) information that is set in a port of the communication node, the port having been connected to the terminal or the virtual machine, on the basis of a virtual network to which the detected terminal or virtual machine belongs; and a VLAN information setting unit 13 configured to set the determined VLAN information in the port. When the VLAN information setting unit 13 instructs a communication node to set the VLAN information in the specified port, a control message for an additional function, which is referred to as an "Experimenter message" in Non-patent Literature 2, can be used. Alternatively, a network setting protocol such as NETCONF may be used. Alternatively, the VLAN information may be set via an external system.

With this configuration, at least, appropriate VLAN information is set in a communication node port to which a terminal or a virtual machine has been connected. Namely, when connection of an unknown terminal or virtual machine to a communication node is detected, appropriate VLAN information is automatically set. Thus, the labor on the network administrator or the like can be reduced.

As will be described below, to detect connection of a terminal or a virtual machine, the connection detection unit 11 may be notified by each communication node of reception of a new packet. Alternatively, the connection detection unit 11 may be notified by a virtual network management apparatus, a virtual machine management apparatus, or the like.

[First Exemplary Embodiment]

Figure 2:
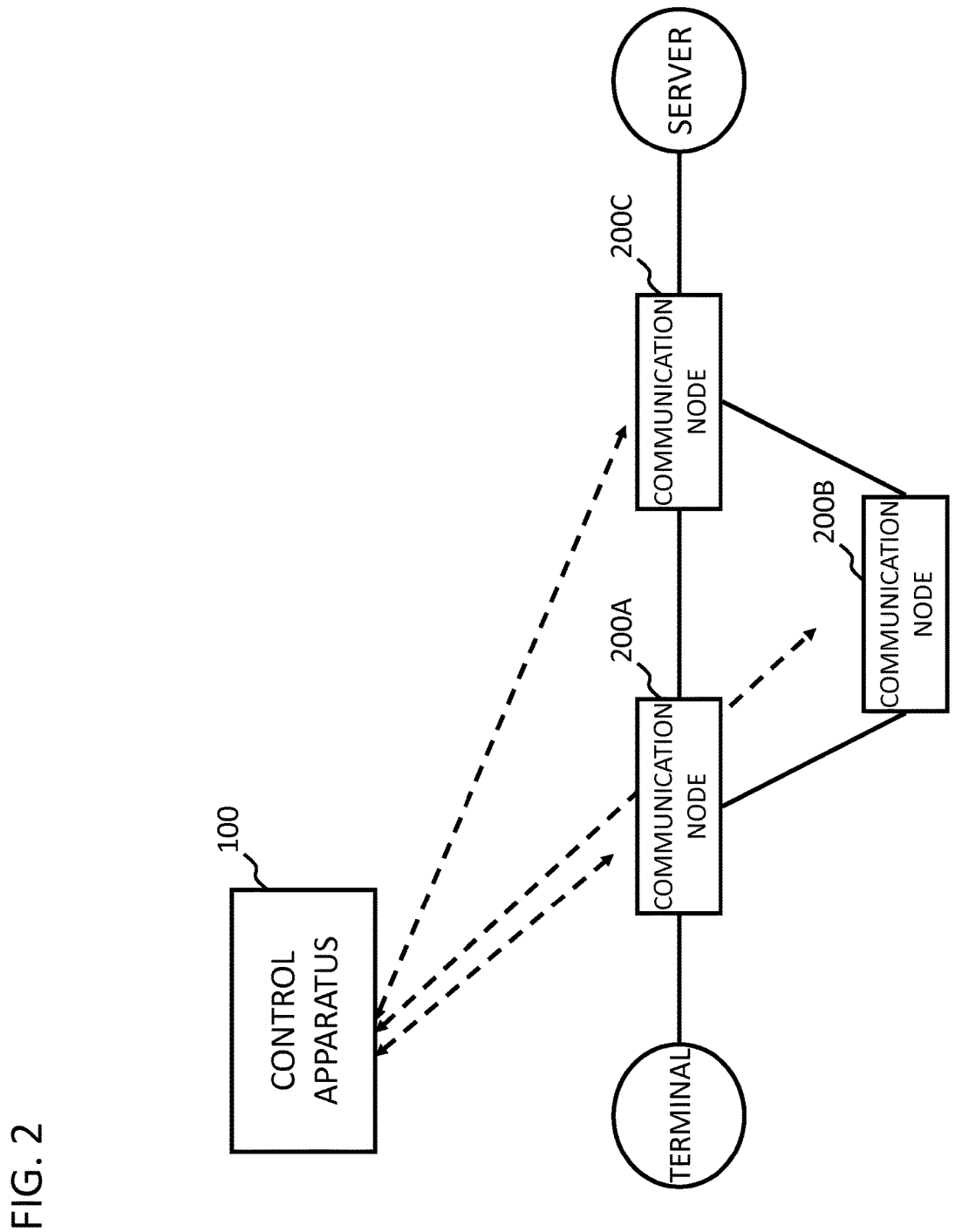
FIG. 2 illustrates a configuration of a communication system according to a first exemplary embodiment of the present invention.

Next, a first exemplary embodiment of the present invention will be described in detail with reference to the drawings. FIG. 2 illustrates a configuration of a communication system according to a first exemplary embodiment of the present invention. FIG. 2 illustrates a plurality of communication nodes 200A to 200C that are connected to each other to configure a network (any one of the communication nodes 200A to 200C will be referred to as a "communication node 200" unless the communication nodes 200A to 200C need to be distinguished from each other), a control apparatus 100 that controls the network by setting control information in these communication nodes 200, and a terminal and a server that communicate with each other via the network configured by the communication nodes 200.

Each communication node 200 processes a packet by referring to its own flow entry that is set as control information. An OpenFlow switch in Non-patent Literature 2 can be used as each communication node. In addition, each communication node 200 according to the present exemplary embodiment includes a function of dropping a packet, to which specified VLAN information is not set, instead of outputting the packet from a certain port (this function will be referred to as a "VLAN gate function"). Each communication node 200 may be a physical switch or a virtual switch that operates on a virtual server or the like.

The control apparatus 100 controls the communication nodes 200 by setting flow entries as control information in the communication nodes 200. The OpenFlow controller in Non-patent Literature 2 can be used as the control apparatus.

Figure 3:
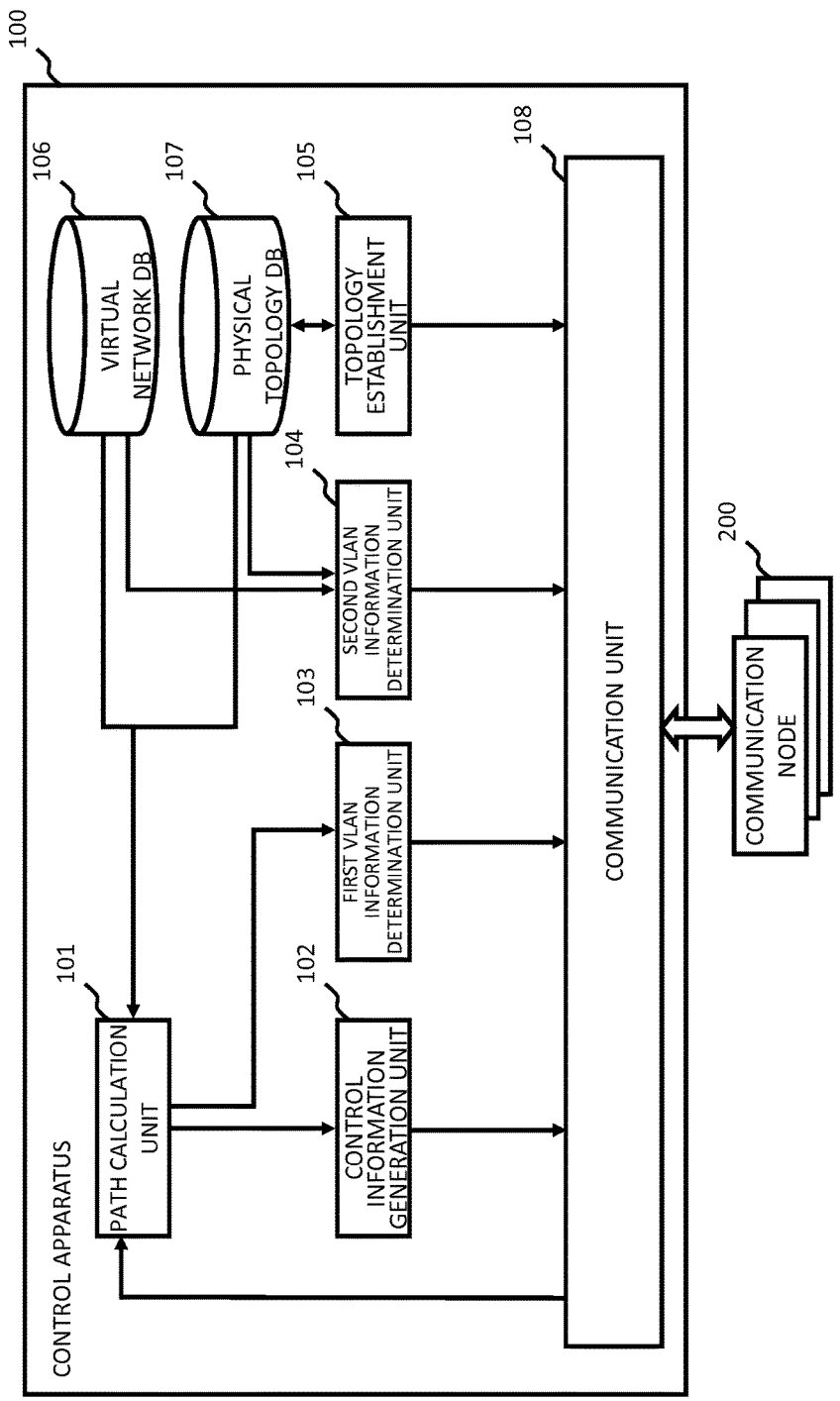
FIG. 3 is a block diagram illustrating a configuration of a control apparatus according to the first exemplary embodiment of the present invention.

FIG. 3 is a block diagram illustrating a configuration of the control apparatus 100 according to the first exemplary embodiment of the present invention. As illustrated in FIG. 3, the control apparatus 100 includes a path calculation unit 101, a control information generation unit 102, a first VLAN information determination unit 103, a second VLAN information determination unit 104, a topology establishment unit 105, a virtual network database (virtual network DB) 106, a physical topology database (physical topology DB) 107, and a communication unit 108 that exchanges various types of control messages with each communication node 200 (corresponding to the above VLAN information setting unit 13).

The topology establishment unit 105 causes the communication nodes 200 to transmit topology check packets via the communication unit 108. On the basis of the result of this operation, the topology establishment unit 105 establishes a network topology configured by the communication nodes 200 and stores the topology in the physical topology database (physical topology DB) 107.

Figure 4:
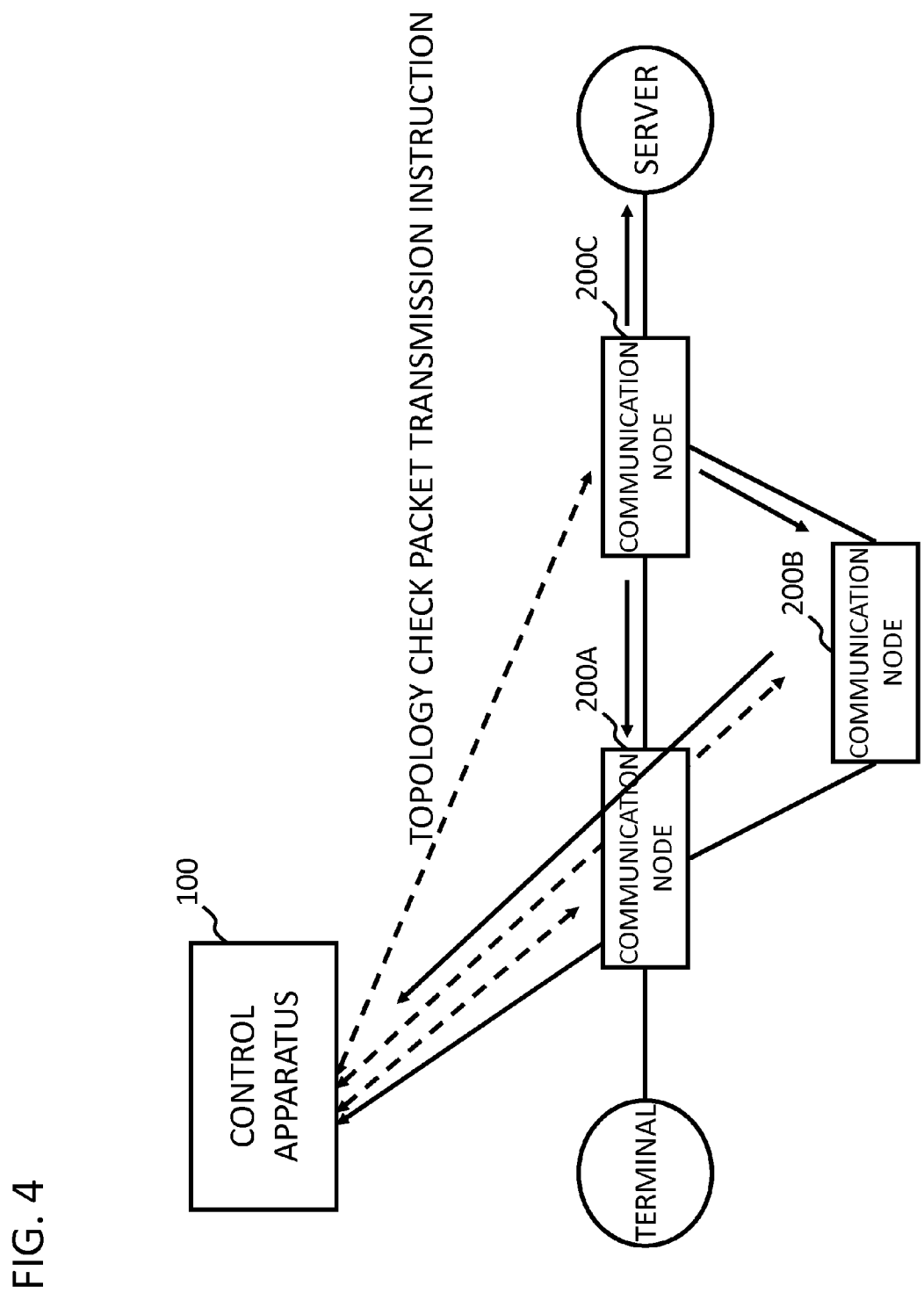
FIG. 4 illustrates an exemplary topology establishment operation performed by the control apparatus according to the first exemplary embodiment of the present invention.

FIG. 4 illustrates an exemplary topology establishment operation performed by the control apparatus. In the example in FIG. 4, when the control apparatus 100 transmits a topology check packet transmission instruction to the communication node 200C, the communication node 200C transmits a topology check packet from each of the ports other than the port that has received the topology check packet transmission instruction (if any one of the ports outputting a topology check packet includes the VLAN gate function, the control apparatus 100 may instruct transmission of a topology check packet in which appropriate VLAN information is set or outputting of a packet instructed by the control apparatus 100 may be exempt from the VLAN gate function). By detecting that the communication nodes 200A and 200B have received the topology check packet from the communication node 200C, the control apparatus 100 can establish the network topology configured by the communication nodes 200. The control apparatus 100 may establish the network topology by using a method other than the above method. For example, the control apparatus 100 may detect the topology by using LLDP (Link Layer Discovery Protocol) or another routing protocol.

In addition, it is preferable that the control apparatus 100 collect information about the capability of each communication node 200, in addition to the information about the topology of the communication nodes 200. In this way, the control apparatus 100 can automatically collect information about the ports of the communication nodes 200 and whether each port includes the VLAN gate function.

The virtual network DB 106 is a database storing information about a configuration of a virtual network configured by communication nodes 200.

Figure 5:
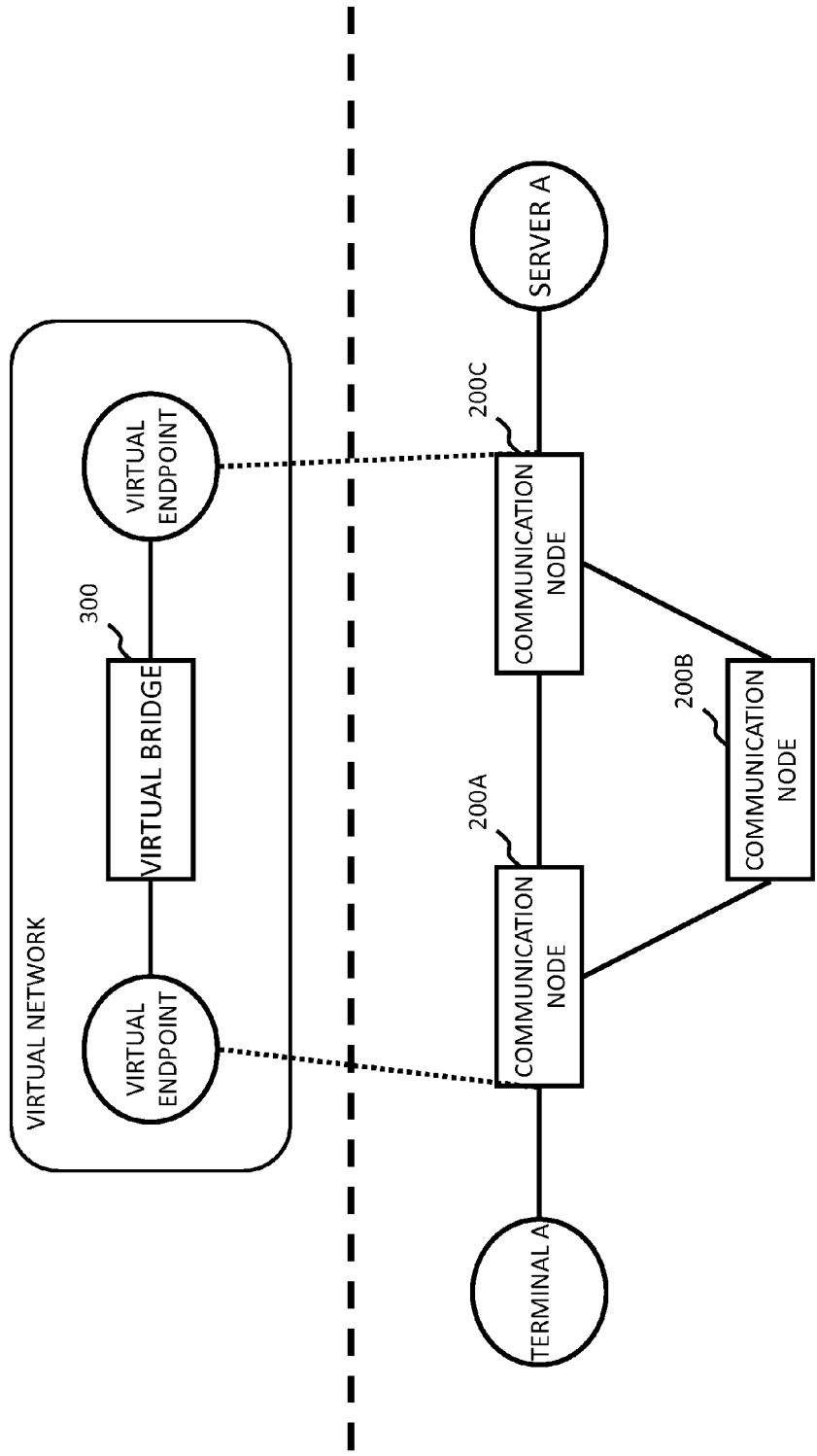
FIG. 5 illustrates an exemplary configuration of a virtual network configured by communication nodes according to the first exemplary embodiment of the present invention.

FIG. 5 illustrates an exemplary configuration of a virtual network configured by communication nodes 200 according to the first exemplary embodiment of the present invention. In the example in FIG. 5, a virtual network including a virtual bridge 300 virtually configured by controlling the communication nodes 200A to 200C is illustrated. Two endpoints of the virtual bridge are mapped with certain ports of the communication nodes 200A and 200C. By mapping a virtual network with ports of the communication nodes 200A and 200C in this way, a plurality of virtual networks logically separated from a single physical network can be established.

FIG. 6 illustrates exemplary VLAN gate control information stored in the virtual network DB 106 according to the first exemplary embodiment of the present invention. In the example in FIG. 6, a gate VLAN ID set on each terminal side, a core VLAN ID set in ports connecting communication nodes, and a server-side gate VLAN ID are associated with each other per virtual network. For example, a communication through a virtual network A whose VLAN ID is 100 and a communication through a virtual network B whose VLAN ID is 300 are aggregated to a communication having a shared core VLAN ID of 4094 in a core network configured by the communication nodes 200A to 200C. Thus, the VLAN ID of 4094 needs to be set in a core-network-side port of an entry-side communication node. In this way, by using the above VLAN gate function, the entry-side communication node can drop a packet which is addressed to a destination beyond the core network and which does not indicate the VLAN ID of 4094. Likewise, the VLAN ID of 200 needs to be set in a port of an exit-side communication node, the port being connected to the server. In this way, likewise, an exit-side communication node can drop a packet which is addressed to the server side and which does not indicate the VLAN ID of 200. Thus, according to the present exemplary embodiment, since there is no need to set control information (flow entries) for dropping packets in which appropriate VLAN ID is not set, the number of flow entries set in the communication nodes can be reduced.

In addition, as described above, by using a certain shared VLAN ID in the core network, the number of flow entries set in the communication nodes 200 can be reduced. In addition, the reduction in the number of flow entries makes it easier to implement the control apparatus 100.

On the basis of the virtual network configuration information stored in the virtual network DB 106 and the topology information stored in the physical topology DB, the second VLAN information determination unit 104 determines a VLAN ID that is set in a port of a communication node 200, the port having been connected to an external apparatus (for example, the server A in FIG. 5), and sets the determined VLAN ID in the port via the communication unit 108.

Figure 7:
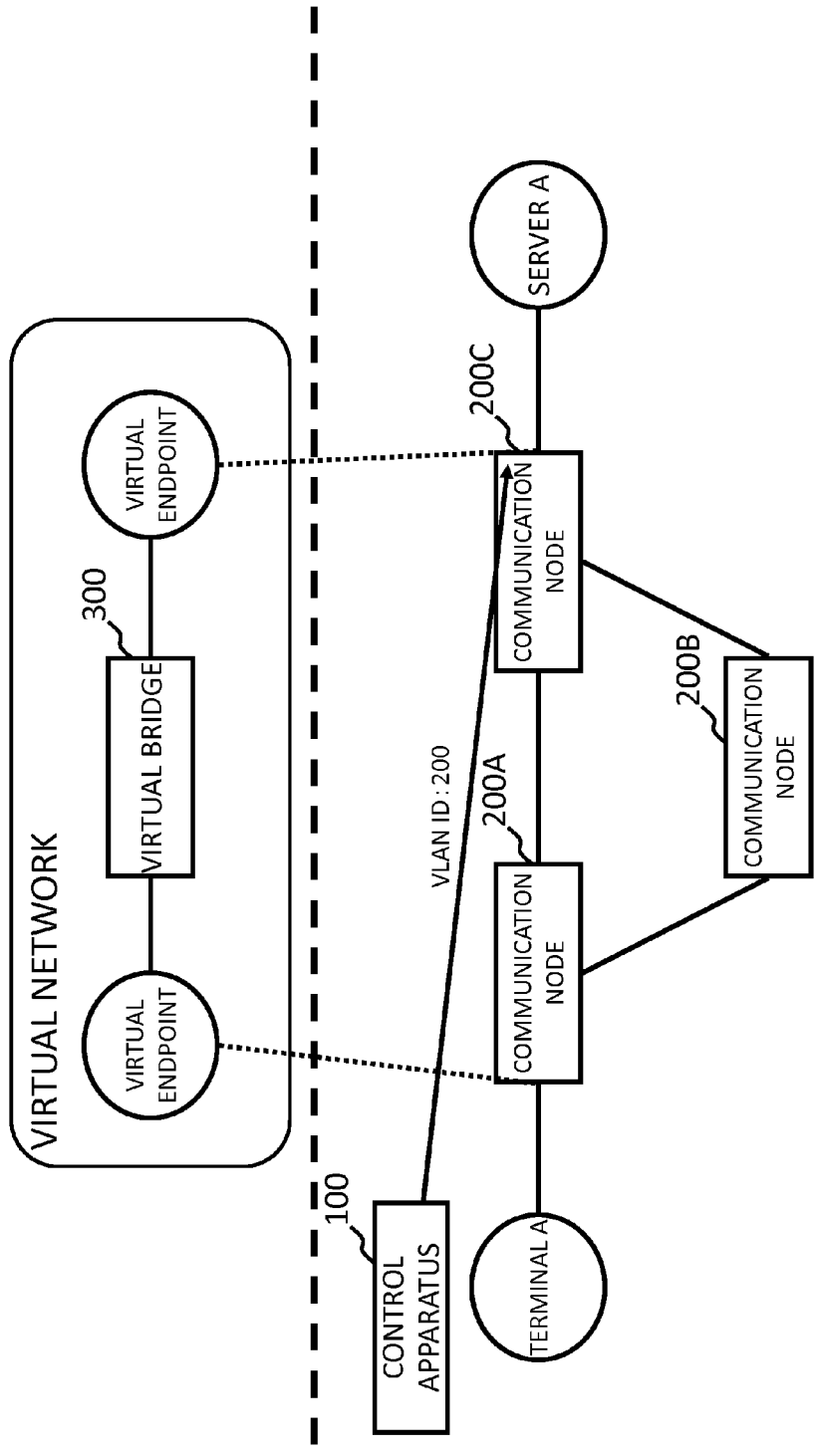
FIG. 7 illustrates an exemplary VLAN information setting operation performed by the control apparatus according to the first exemplary embodiment of the present invention.

FIG. 7 illustrates an exemplary VLAN information setting operation performed by the second VLAN information determination unit 104. For example, from the information stored in the physical topology DB 107, it is clear that the communication node 200C is connected to the server A. In addition, from the information stored in the virtual network DB 106, it is clear that the port of the communication node 200C, the port connected to the server A, is mapped with a virtual endpoint of the virtual network. The second VLAN information determination unit 104 refers to the VLAN gate control information illustrated in FIG. 6 and sets "200" as a server-side gate VLAN ID in the port of the communication node 200C, the port connected to the server A.

In addition, if the information in the virtual network DB 106 or the physical topology DB 107 is updated, the second VLAN information determination unit 104 may set a VLAN ID on the basis of the updated content. For example, if a server B is newly connected to the communication node 200C, the second VLAN information determination unit 104 sets "200" as a server-side gate VLAN ID in a port of the communication node 200C, the port having been connected to the server B, as with the case of the above server A. In addition, if the server A is disconnected from the communication node 200C, the VLAN ID may be deleted from the port of the communication node 200C, the port having been disconnected from the server A.

When receiving a control information setting request from a communication node 200 via the communication unit 108 ("Packet-In" message in Non-patent Literature 2), the path calculation unit 101 refers to information about the port that has received the packet which causes the communication node 200 to transmit the control information setting request, an ID of the source terminal, and the like and determines a virtual network to which the source terminal belongs. Next, if the virtual network is determined, the path calculation unit 101 calculates a forwarding path from the start-point communication node to a communication node 200 connected to the destination, on the basis of the packet information included in the control information setting request.

To realize packet forwarding on the forwarding path calculated by the path calculation unit 101, the control information generation unit 102 generates and sets control information (flow entries) to be set in the relevant communication nodes 200 on the calculated forwarding path via the communication unit 108. In addition, the control information generation unit 102 refers to the VLAN gate control information illustrated in FIG. 6 and sets control information (flow entries) for performing necessary header rewriting in the communication nodes on the forwarding path.

When the path calculation unit 101 calculates a path in response to a control information setting request ("Packet-In" message in Non-patent Literature 2), the first VLAN information determination unit 103 determines a VLAN ID corresponding to the determined virtual network for the port serving as the start point of the path and sets the determined VLAN ID in the port via the communication unit 108. Whether the port serving as the start point of the path includes the VLAN gate function may be determined on the basis of setting information (port information indicating automatic VLAN setting) stored in advance in the control apparatus 100 by a network administrator or on the basis of the information about the capability of each communication node 200 collected from each communication node when the above topology collection operation is performed.

Each unit (processing means) of the control apparatus 100 illustrated in FIG. 2 may be realized by a computer program which causes a computer that constitutes the control apparatus 100 to use its hardware and execute the corresponding processing described above.

Next, an operation according to the present exemplary embodiment will be described in detail with reference to the drawings. FIGS. 8 to 14 illustrate an operation performed when the terminal A has been connected to the communication node 200A and the communication node 200A has received a packet addressed to the server A from the terminal A.

Figure 8:
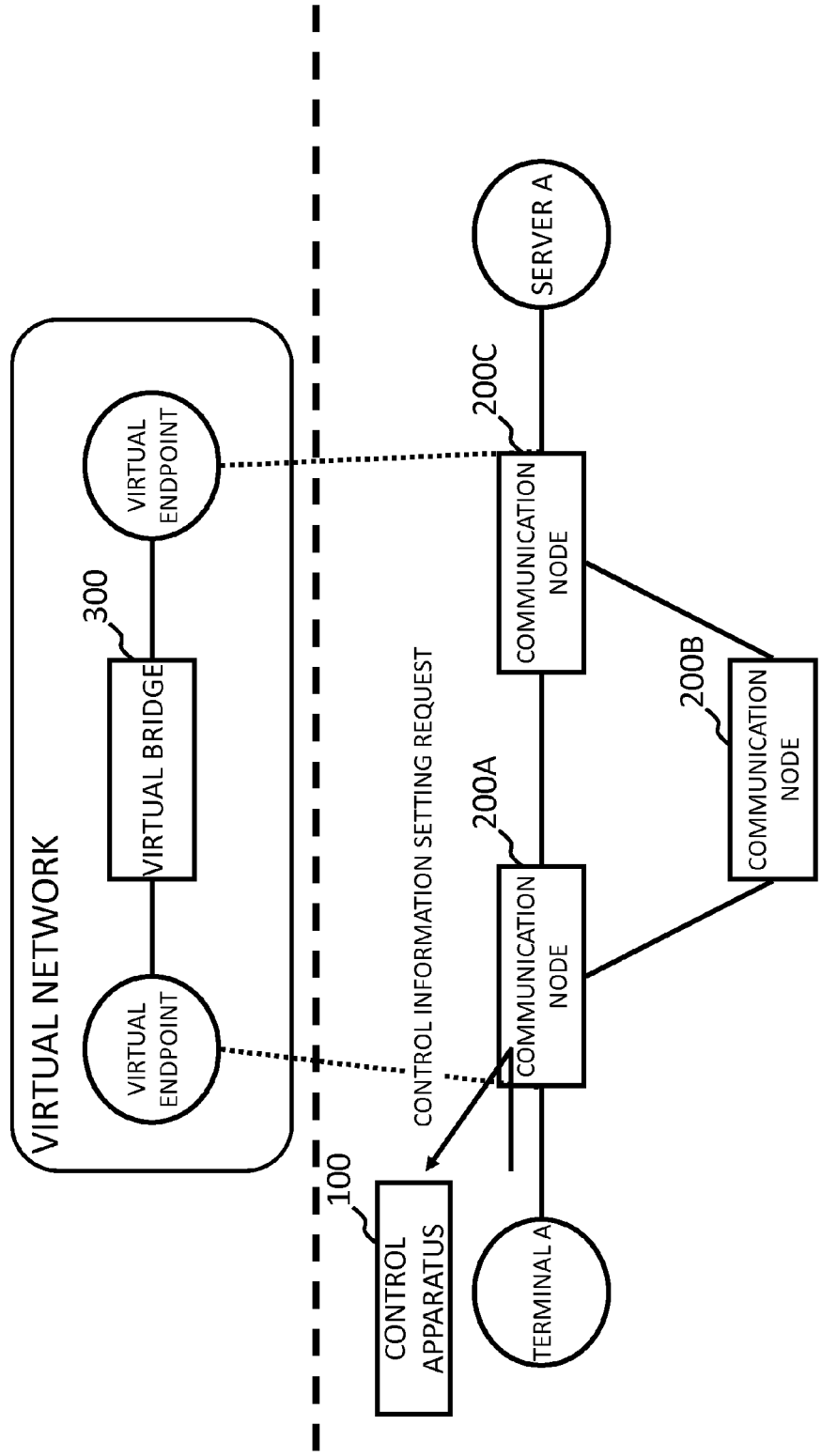
FIG. 8 illustrates an operation performed when a communication node receives a packet from a terminal A according to the first exemplary embodiment of the present invention.

When receiving the packet addressed to the server A from the terminal A, the communication node 200A determines that the control information stored therein does not include control information having a match condition(s) that matches the packet addressed to the server A from the terminal A. Thus, as illustrated in FIG. 8, the communication node 200A transmits a control information setting request ("Packet-In" message Non-patent Literature 2) to the control apparatus 100.

Figure 9:
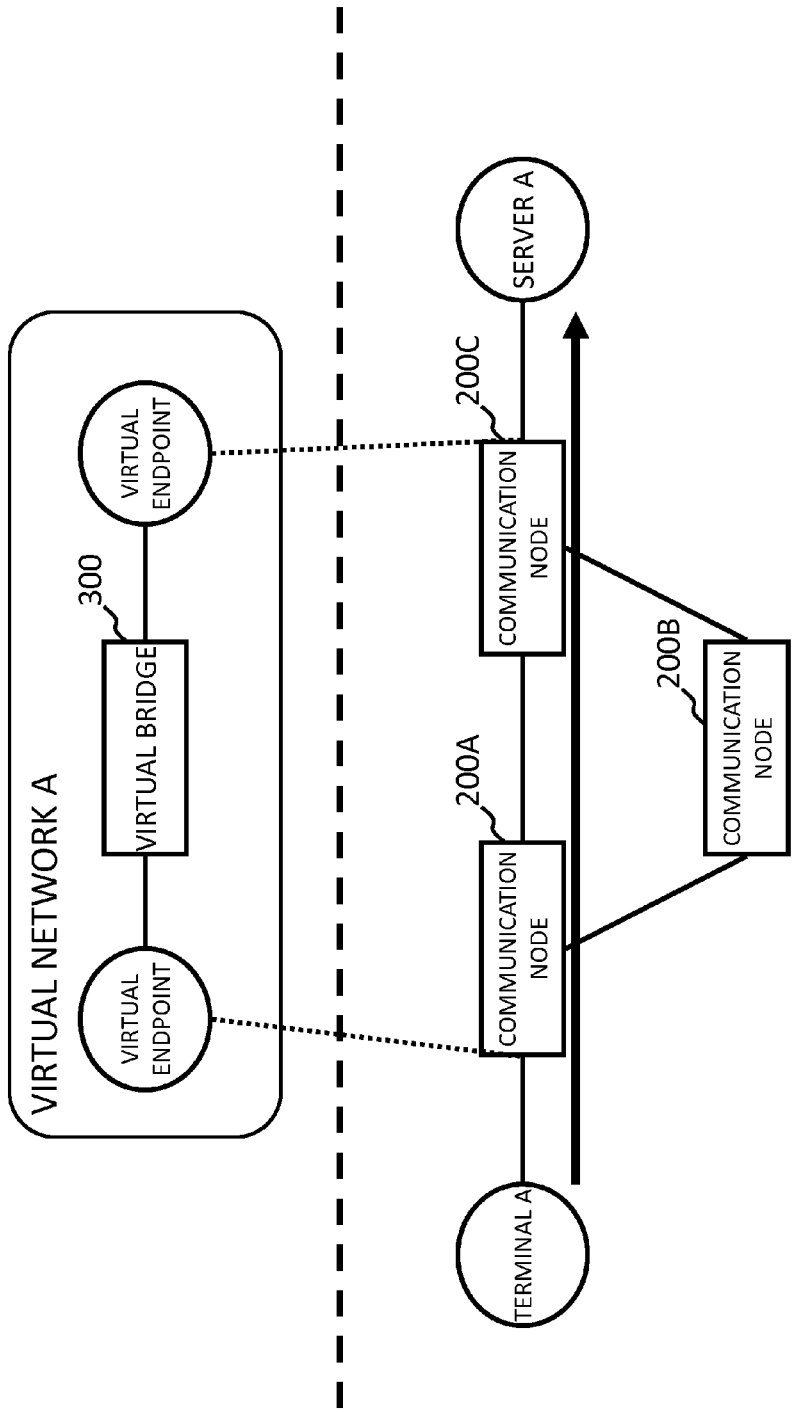
FIG. 9 illustrates an exemplary operation of calculating a path performed by the control apparatus according to the first exemplary embodiment of the present invention.

After receiving the control information setting request, for example, the control apparatus 100 determines that the terminal A belongs to the virtual network A and calculates a forwarding path for forwarding the packet from the communication node 200A to the server A via the communication node 200C, as illustrated in FIG. 9. Next, the control apparatus 100 sets control information (flow entries) for forwarding the packet on the forwarding path and performing rewriting of VLAN IDs on the basis of the VLAN gate control information in the forwarding nodes 200A and 200C on the forwarding path.

Figure 10:
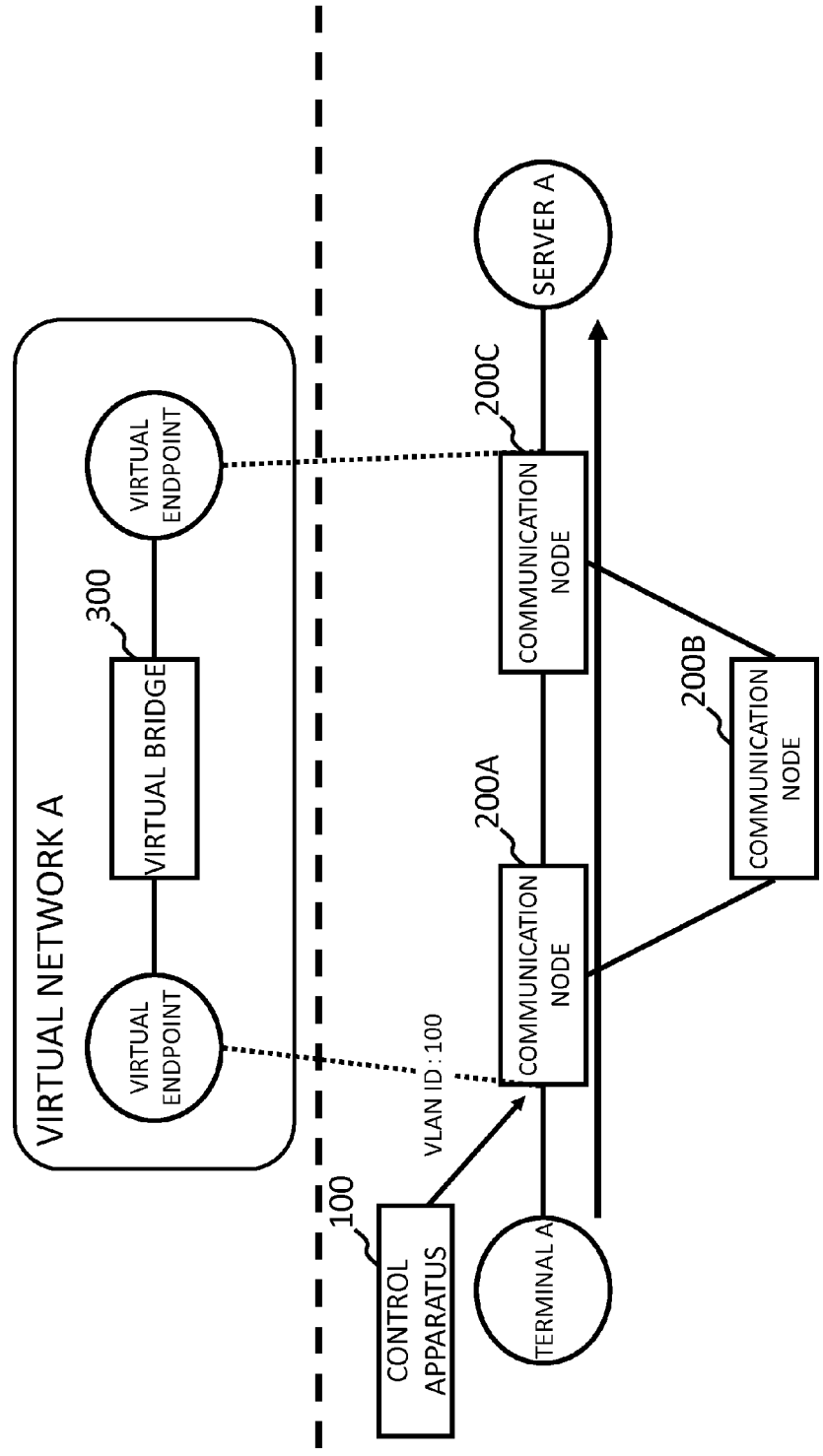
FIG. 10 illustrates an exemplary operation of setting VLAN information in an entry communication node performed by the control apparatus according to the first exemplary embodiment of the present invention.

Next, as illustrated in FIG. 10, the control apparatus 100 allocates "100" to the port serving as the start point of the calculated forwarding path as the gate VLAN ID of the virtual network A as indicated in the VLAN gate control information in FIG. 6.

Figure 11:
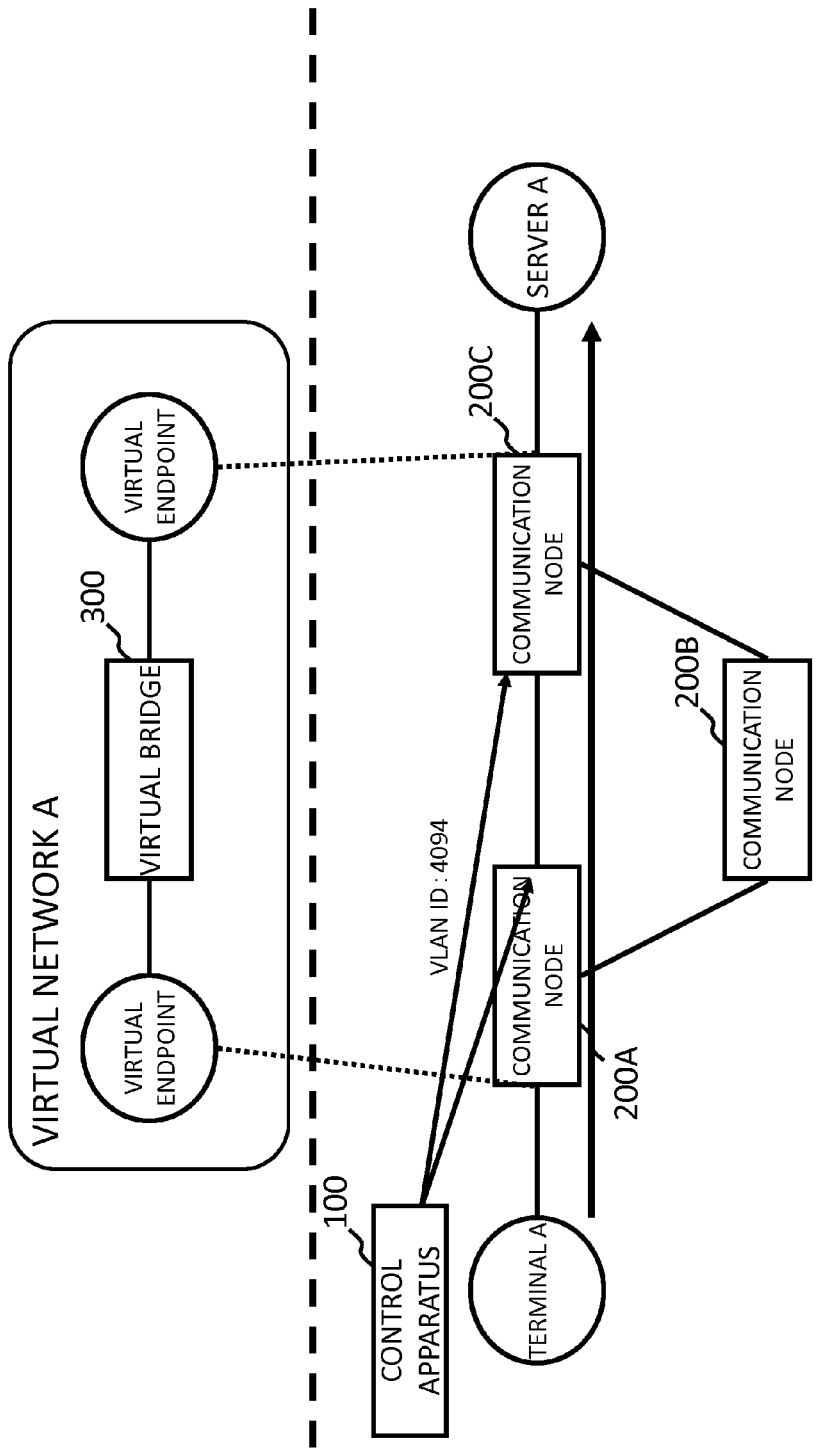
FIG. 11 illustrates an exemplary operation of setting VLAN information in interfaces between communication nodes performed by the control apparatus according to the first exemplary embodiment of the present invention.

In addition, as illustrated in FIG. 11, the control apparatus 100 allocates "4094" to the ports connecting the communication nodes on the calculated forwarding path as the CORE VLAN ID of the virtual network A as indicated in the VLAN gate control information in FIG. 6.

As illustrated in FIG. 7, "200" as the server-side gate VLAN ID has already been allocated by the second VLAN information determination unit 104 to the port of the communication node 200C, the port serving as the end point of the path and connected to the server A. In this way, preparation for packet forwarding from the terminal A to the server A has thus been completed.

Figure 12:
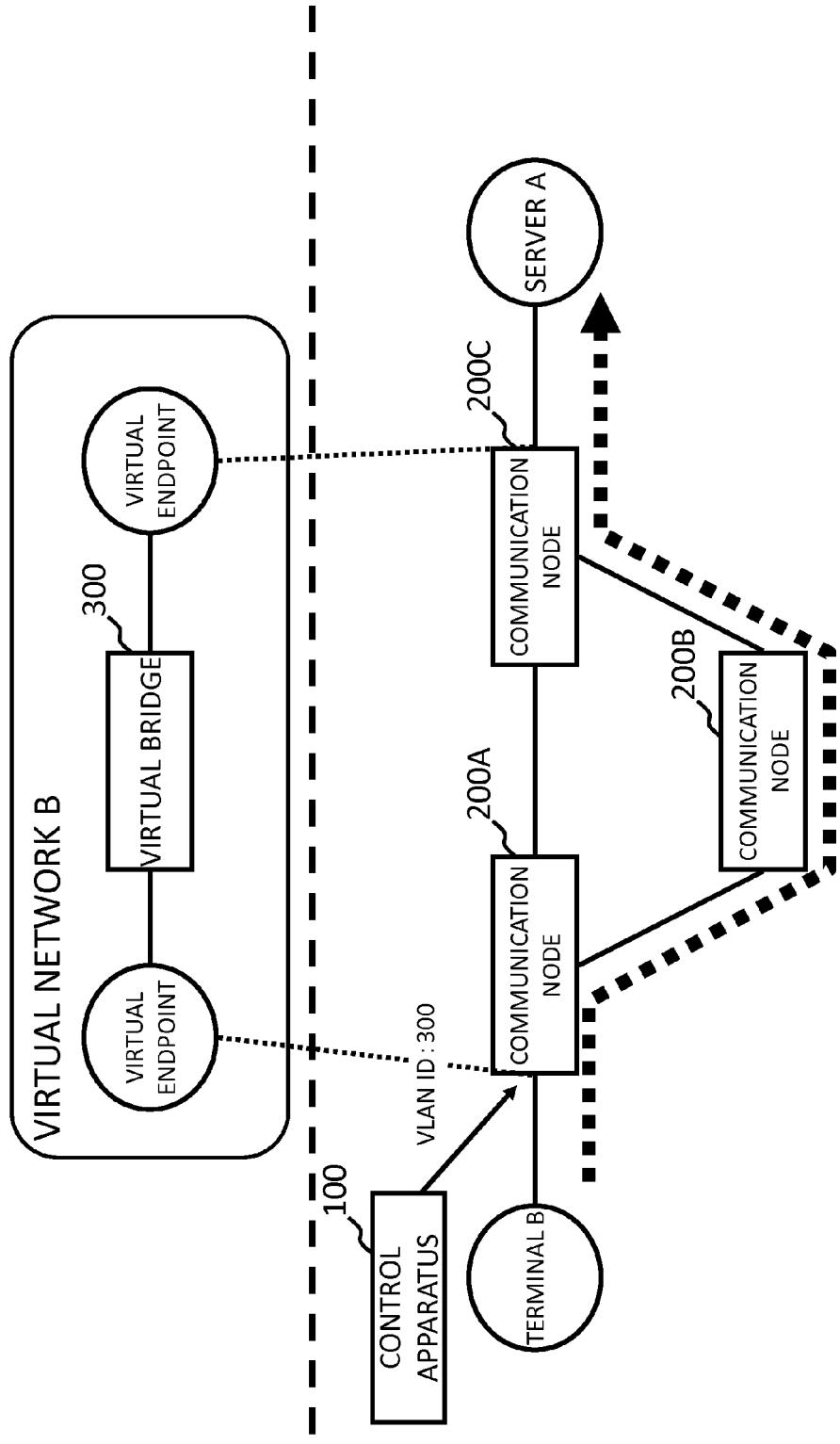
FIG. 12 illustrates another exemplary operation of calculating a path and of setting VLAN information in an entry communication node performed by the control apparatus according to the first exemplary embodiment of the present invention.

Next, an example in which a terminal B that belongs to the virtual network B has been connected to the communication node 200A and the communication node 200A has received a packet addressed to the server A from the terminal B will be described. In this case, the control apparatus 100 also calculates a forwarding path for forwarding the packet from the communication node 200A to the server A via the communication nodes 200B and 200C, as illustrated in FIG. 12. Next, the control apparatus 100 sets control information (flow entries) for forwarding the packet on the forwarding path and performing rewriting of VLAN IDs in the forwarding nodes 200A to 200C on the forwarding path. In addition, the control apparatus 100 allocates "300" to the port serving as the start point of the forwarding path as the gate VLAN ID of the virtual network B as indicated in the VLAN gate control information in FIG. 6.

Figure 13:
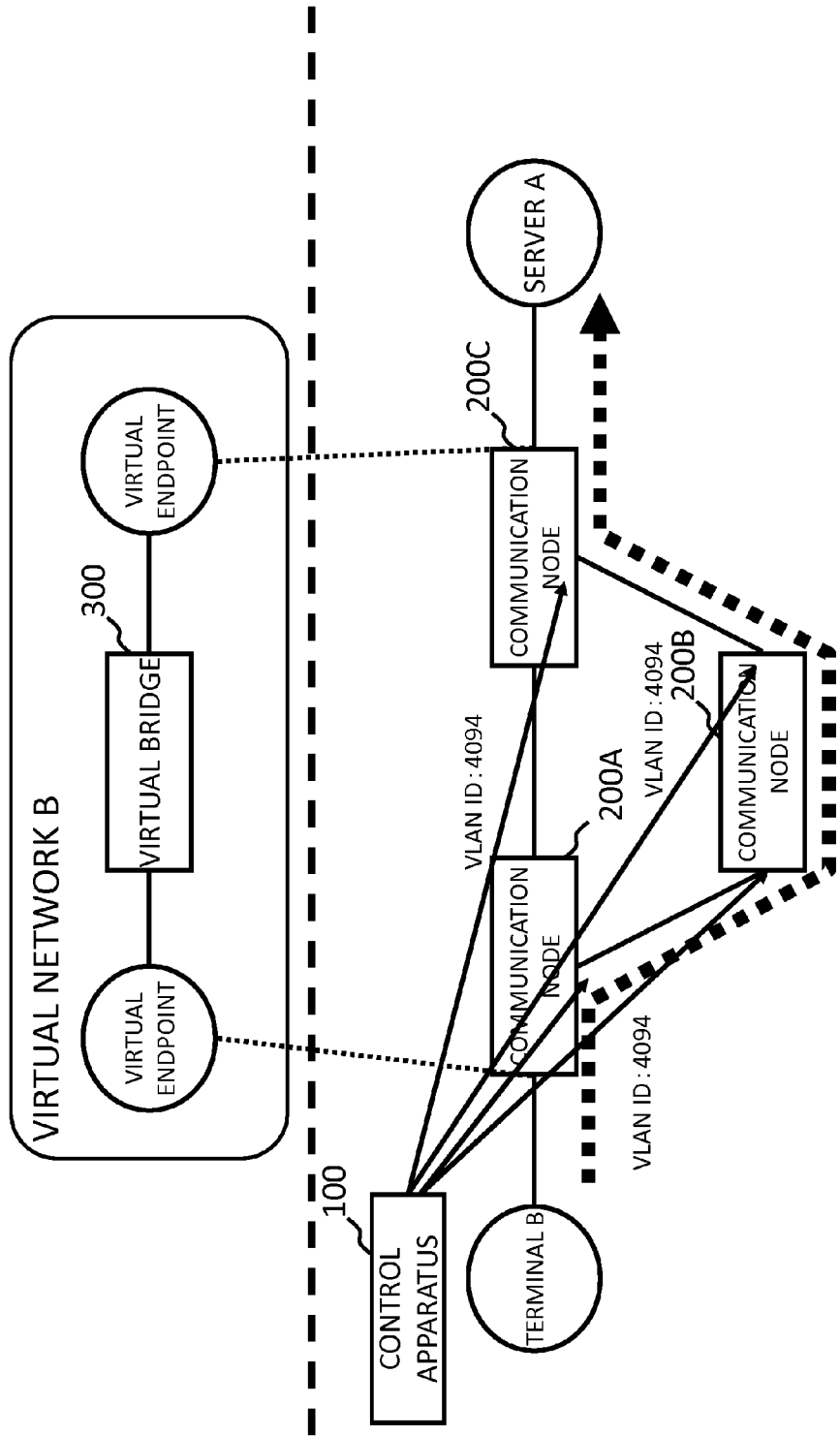
FIG. 13 illustrates another exemplary operation of setting VLAN information in interfaces between communication nodes performed by the control apparatus according to the first exemplary embodiment of the present invention.

In addition, as illustrated in FIG. 13, the control apparatus 100 allocates "4094" in the ports connecting the communication nodes on the calculated forwarding path as the CORE VLAN ID of the virtual network B as indicated in the VLAN gate control information in FIG. 6.

As described with reference to FIG. 7, "200" as the server-side gate VLAN ID has already been allocated by the second VLAN information determination unit 104 to the port of the communication node 200C, the port serving as the end point of the path and connected to the server A. In this way, preparation for packet forwarding from the terminal B to the server A has thus been completed.

Figure 14:
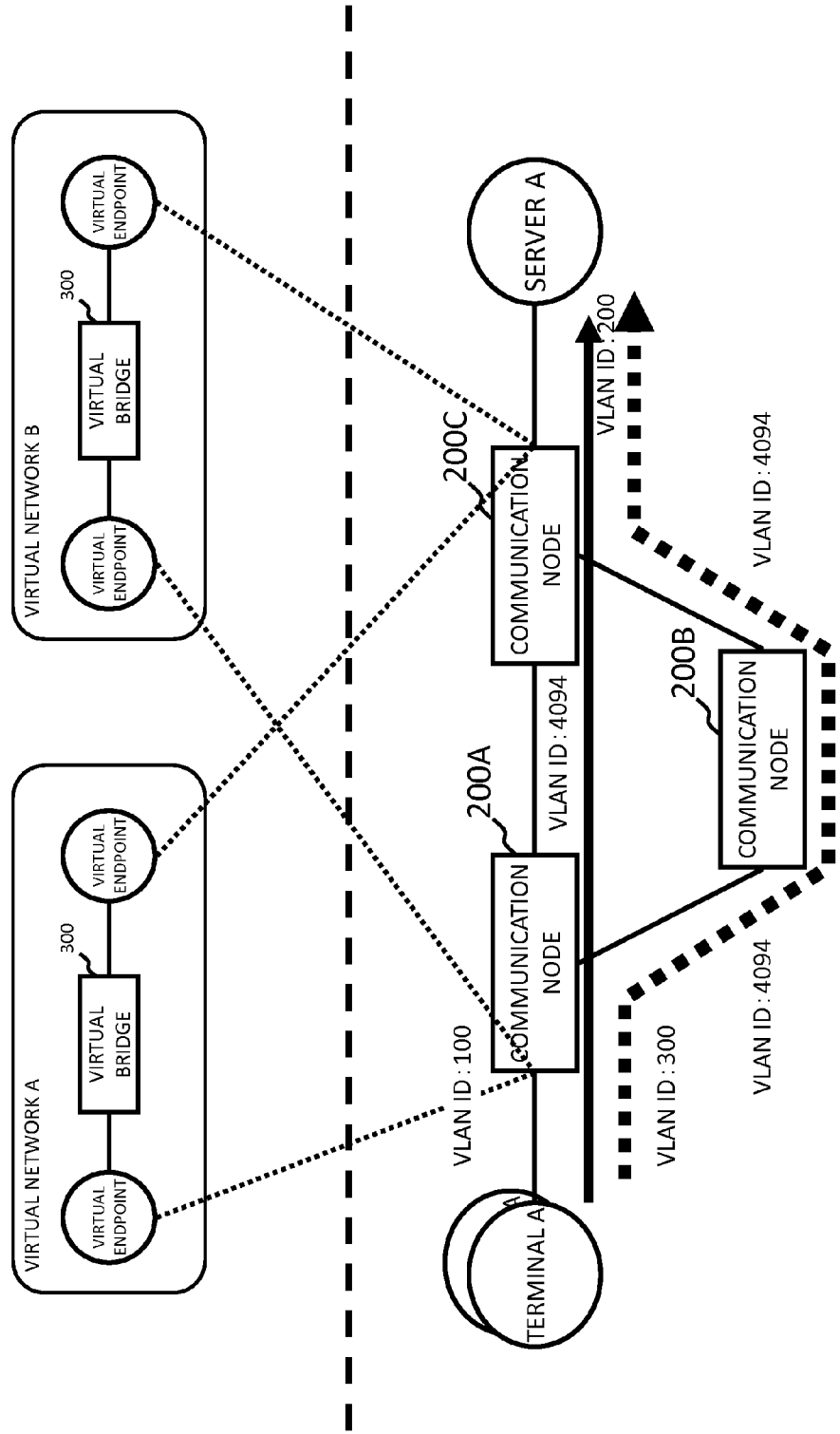
FIG. 14 illustrates VLAN information set in the interfaces of the communication nodes according to the first exemplary embodiment of the present invention.

FIG. 14 illustrates packet forwarding paths (a bold solid line and a bold dashed line) realized by the above series of operations and the VLAN IDs set in the ports on the paths. Thus, according to the present exemplary embodiment, when the control apparatus 100 sets a path, VLAN IDs necessary for the relevant ports of the communication nodes 200 on the path can be set simultaneously. As a result, the labor required for setting the VLAN IDs in the relevant ports of each communication node is reduced. In addition, since these communication nodes use the set VLAN IDs as the VLAN gate functions, respectively, the number of flow entries is reduced and the response of each switch is improved.

In the above procedure, it is desirable that the VLAN IDs set in the ports of the communication nodes 200 by the control apparatus 100 be deleted at appropriate timing. For example, a VLAN ID may be deleted after a certain time period elapses (time-out) or when control information (flow entry) set in a communication node 200 is deleted by an explicit instruction from the control apparatus 100.

While exemplary embodiments of the present invention have thus been described, the present invention is not limited thereto. Further variations, substitutions, or adjustments can be made without departing from the basic technical concept of the present invention. For example, the configurations of the networks and elements illustrated in the drawings are used only as examples to facilitate understanding of the present invention. Namely, the present invention is not limited to the configurations illustrated in the drawings.

In addition, for example, while the above exemplary embodiments have been described assuming that the control apparatus 100 sets VLAN IDs when receiving a control information setting request from a communication node, the control apparatus 100 may set VLAN IDs when the topology is changed by connection of a terminal or a virtual machine to a communication node or addition of a communication node, for example.

In addition, for example, the above exemplary embodiments have been described assuming that each communication node 200 has a function of dropping a packet in which specified VLAN information is not set instead of outputting the packet from a certain port of the communication node 200 as the VLAN gate of each communication node 200. However, each communication node 200 may have a function of dropping, when receiving a packet in which specified VLAN information is not set, the packet. In such case, when a communication node 200 receives a packet in which VLAN information is not set, transmission of a control information setting request from the communication node 200 to the control apparatus 100 is prevented. Thus, it is necessary to provide a mechanism for notifying the control apparatus 100 of change of the topology by connection of a terminal or a virtual machine to a communication node or addition of a communication node, for example.

Finally, suitable modes of the present invention will be summarized.

[Mode 1]
(See the control apparatus according to the above first aspect)

[Mode 2]
The control apparatus according to mode 1;
wherein the first VLAN information determination unit determines the VLAN information if the port to which the terminal has been connected includes a function of dropping a packet in which specified VLAN information is not set instead of transmitting the packet.

[Mode 3]
The control apparatus according to mode 1 o 2;
wherein the first VLAN information determination unit determines the VLAN information if the port to which the terminal has been connected includes a function of dropping, when receiving a packet in which specified VLAN information is not set, the packet.

[Mode 4]
The control apparatus according to any one of modes 1 to 3;
wherein the VLAN information setting unit sets the VLAN information by transmitting a control message for causing the control target communication node to set the VLAN information in a specified port.

[Mode 5]
The control apparatus according to any one of modes 1 to 4, further including:
a second VLAN information determination unit configured to determine VLAN information that is set in a port of the control target communication node, the port connected to an external apparatus, on the basis of virtual network configuration information and topology information received from the control target communication node.

[Mode 6]
The control apparatus according to any one of modes 1 to 5;
wherein, on the basis of the virtual network configuration information and the topology information received from the control target communication node, VLAN information is set in ports connecting control target communication nodes.

[Mode 7]
The control apparatus according to any one of modes 1 to 6;
wherein the connection detection unit detects connection of a terminal or a virtual machine by receiving a control information setting request from the control target communication node.

[Mode 8]
(See the communication system according to the above second aspect)

[Mode 9]
(See the communication node control method according to the above third aspect)

[Mode 10]
(See the program according to the above fourth aspect)

Modes 8 to 10 can be expanded in the same way as mode 1 is expanded to modes 2 t 7.

The disclosure of each of the above Non-patent Literatures is incorporated herein by reference thereto. Modifications and adjustments of the exemplary embodiments and the examples are possible within the scope of the overall disclosure (including the claims) of the present invention and based on the basic technical concept of the present invention. In addition, various combinations and selections of various disclosed elements (including the elements in each of the claims, exemplary embodiments, examples, drawings, etc.) are possible within the scope of the claims of the present invention. Namely, the present invention of course includes various variations and modifications that could be made by those skilled in the art according to the overall disclosure including the claims and the technical concept. In particular, the present description discloses numerical value ranges. However, even if the description does not particularly disclose arbitrary numerical values or small ranges included in the ranges, these values and ranges should be deemed to have been specifically disclosed.

10, 100 control apparatus
11 connection detection unit
12, 103 first VLAN information determination unit
13 VLAN information setting unit
20, 200A to 200C communication node
101 path calculation unit
102 control information generation unit
104 second VLAN information determination unit
105 topology establishment unit
106 virtual network database (virtual network DB)
107 physical topology database (physical topology DB)
108 communication unit
300 virtual bridge

What is claimed is:

1. A control apparatus, comprising:
a memory storing instructions;
a processor executing the instructions to:
  detect connection of a terminal or a virtual machine to a port of a control target communication node;
  determine VLAN (Virtual Local Area Network) information for the port of the control target communication node, the port having been connected to the terminal or the virtual machine, on the basis of a virtual network to which the detected terminal or virtual machine belongs;
  configure the port according to the determined VLAN information; and
  determine VLAN information that is set in a port of the control target communication node, the port connected to an external apparatus, on the basis of virtual network configuration information and topology information received from the control target communication node,
wherein the processor configures the port so that a packet is dropped at the port instead of being transmitted at the port if the packet is not associated with the VLAN information,
and wherein the control apparatus is centralized and not part of the control target communication node, such that the control apparatus centrally determines the VLAN information and configures the port of the communication node and ports of other communication nodes.

2. The control apparatus according to claim 1;
wherein the processor determines the VLAN information if the port to which the terminal has been connected includes a function of dropping, when receiving a packet in which specified VLAN information is not set, the packet.

3. The control apparatus according to claim 1;
wherein the processor sets the VLAN information by transmitting a control message for causing the control target communication node to set the VLAN information in a specified port.

4. The control apparatus according to claim 1;
wherein the processor detects connection of a terminal or a virtual machine by receiving a control information setting request from the control target communication node.

5. A communication system, comprising:
a communication node configured to include a function of dropping, when receiving an instruction for transmitting a packet in which specified VLAN (Virtual Local Area Network) information is not set via a certain port, the packet or a function of dropping, when receiving a packet in which specified VLAN information is not set via a certain port, the packet; and
a control apparatus that is centrally located and that is not part of the communication node, the control apparatus comprising:
a memory storing instructions;
a processor that executes the instructions to:
  detect connection of a terminal or a virtual machine to the specified port of the communication node;
  determine VLAN information for the port of the control target communication node communication node, the port having been connected to the terminal or the virtual machine, on the basis of a virtual network to which the detected terminal or virtual machine belongs;
  configure the port according to the determined VLAN information;
  determine VLAN information that is set in a port of the control target communication node, the port connected to an external apparatus, on the basis of virtual network configuration information and topology information received from the control target communication node,
wherein the processor configures the port so that a packet is dropped at the port instead of being transmitted at the port if the packet is not associated with the VLAN information,
and wherein the control apparatus centrally determines the VLAN information and configures the port of the communication node and ports of other communication nodes.

6. A communication node control method, comprising:
detecting, by a control apparatus, connection of a terminal or a virtual machine to a port of a control target communication node;
determining, by the control apparatus, VLAN (Virtual Local Area Network) information for the port of the control target communication node, the port having been connected to the terminal or the virtual machine, on the basis of a virtual network to which the detected terminal or virtual machine belongs;
configuring, by the control apparatus, the port according to the determined VLAN information and
determining, by the control apparatus, VLAN information that is set in a port of the control target communication node, the port connected to an external apparatus, on the basis of virtual network configuration information and topology information received from the control target communication node,
wherein the control apparatus configures the port so that a packet is dropped at the port instead of being transmitted at the port if the packet is not associated with the VLAN information,
and wherein the control apparatus is centralized and not part of the control target communication node, such that the control apparatus centrally determines the VLAN information and configures the port of the communication node and ports of other communication nodes.

7. A non-transitory computer-readable recording medium storing thereon a program, causing a computer that is a control apparatus that controls communication nodes to execute processing for:
   detecting connection of a terminal or a virtual machine to a port of a control target communication node;
   determining VLAN (Virtual Local Area Network) information for the port of the control target communication node, the port having been connected to the terminal or the virtual machine, on the basis of a virtual network to which the detected terminal or virtual machine belongs;
   configuring the port according to the determined VLAN information;
   determining VLAN information that is set in a port of the control target communication node, the port connected to an external apparatus, on the basis of virtual network configuration information and topology information received from the control target communication node,
   wherein the control apparatus configures the port so that a packet is dropped at the port instead of being transmitted at the port if the packet is not associated with the VLAN information,
   and wherein the control apparatus is centralized and not part of the control target communication node, such that the control apparatus centrally determines the VLAN information and configures the port of the communication node and ports of other communication nodes.

8. The control apparatus according to claim 1;
   wherein the processor determines the VLAN information if the port to which the terminal has been connected includes a function of dropping, when receiving a packet in which specified VLAN information is not set, the packet.

9. The control apparatus according to claim 1;
   wherein processor sets the VLAN information by transmitting a control message for causing the control target communication node to set the VLAN information in a specified port.

10. The control apparatus according to claim 2;
    wherein the processor sets the VLAN information by transmitting a control message for causing the control target communication node to set the VLAN information in a specified port.

11. The control apparatus according to claim 1, wherein the processor is further to:
    determine VLAN information that is set in a port of the control target communication node, the port connected to an external apparatus, on the basis of virtual network configuration information and topology information received from the control target communication node.

12. The control apparatus according to claim 2, wherein the processor is further to:
    determine VLAN information that is set in a port of the control target communication node, the port connected to an external apparatus, on the basis of virtual network configuration information and topology information received from the control target communication node.

13. The control apparatus according to claim 3, wherein the processor is further to:
    determine VLAN information that is set in a port of the control target communication node, the port connected to an external apparatus, on the basis of virtual network configuration information and topology information received from the control target communication node.

14. The control apparatus according to claim 1;
    wherein, on the basis of the virtual network configuration information and the topology information received from the control target communication node, VLAN information is set in ports connecting control target communication nodes.

15. The control apparatus according to claim 2;
    wherein, on the basis of the virtual network configuration information and the topology information received from the control target communication node, VLAN information is set in ports connecting control target communication nodes.

16. The control apparatus according to claim 3;
    wherein, on the basis of the virtual network configuration information and the topology information received from the control target communication node, VLAN information is set in ports connecting control target communication nodes.

17. The control apparatus according to claim 1;
    wherein, on the basis of the virtual network configuration information and the topology information received from the control target communication node, VLAN information is set in ports connecting control target communication nodes.

* * * * *